United States Patent
Nishikata et al.

(10) Patent No.: US 9,356,347 B2
(45) Date of Patent: May 31, 2016

(54) RADAR SYSTEM, SUB-MODULE, AND RADAR PROCESSING METHOD

(71) Applicant: MITSUBISHI HEAVY INDUSTRIES, LTD., Tokyo (JP)

(72) Inventors: Shingo Nishikata, Tokyo (JP); Yuki Uchiyama, Tokyo (JP); Hiroyuki Daigo, Tokyo (JP); Takuya Koyama, Tokyo (JP); Hiroki Uchida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 448 days.

(21) Appl. No.: 13/896,547

(22) Filed: May 17, 2013

(65) Prior Publication Data
US 2014/0152502 A1    Jun. 5, 2014

(30) Foreign Application Priority Data

Nov. 30, 2012   (JP) .................. 2012-263463

(51) Int. Cl.
*H01Q 3/00* (2006.01)
*H01Q 3/34* (2006.01)
*G01S 13/00* (2006.01)
*G01S 13/42* (2006.01)
*G01S 13/87* (2006.01)

(52) U.S. Cl.
CPC ............... *H01Q 3/34* (2013.01); *G01S 13/003* (2013.01); *G01S 13/42* (2013.01); *G01S 13/87* (2013.01)

(58) Field of Classification Search
CPC ......... H01Q 3/00; G01S 13/00; G01S 7/2923; G01S 17/89
USPC .................................................. 342/372, 22
See application file for complete search history.

(56) References Cited

U.S. PATENT DOCUMENTS

| 6,724,340 | B1 | 4/2004 | Carlos et al. |
| 8,817,096 | B1* | 8/2014 | Ni ............................. G01S 17/89 348/144 |
| 2009/0021423 | A1 | 1/2009 | Cheng et al. |
| 2011/0025546 | A1* | 2/2011 | Cook .................... G01S 7/2923 342/22 |
| 2011/0148691 | A1 | 6/2011 | Samaniego et al. |

FOREIGN PATENT DOCUMENTS

| JP | 2005-233723 | 9/2005 |
| JP | 2010-32497 | 2/2010 |

OTHER PUBLICATIONS

Extended European Search Report issued Mar. 11, 2014 in corresponding European Patent Application 13168394.8.

* cited by examiner

*Primary Examiner* — Harry Liu
(74) *Attorney, Agent, or Firm* — Wenderoth, Lind & Ponack, L.L.P.

(57) ABSTRACT

A radar system contains a plurality of sub-modules which irradiate beams for a distributed aperture radar. Each of the plurality of sub-modules irradiates the beam, moves and, and communicates with an external unit for a distributed aperture process. The radar system may contain a command unit configured to command the sub-modules. The command unit measures each sub-module and communicates with the sub-module, acquires necessary data of measurement data of the sub-module, position data received from the sub-module, operation situation data of the sub-module and topographical data around the sub-module, calculates a synthetic beam pattern, calculates the arrangement of the sub-modules when the synthetic beam pattern becomes equal to a predetermined pattern, and instructs each sub-module to move based on the calculated arrangement of the sub-modules.

3 Claims, 7 Drawing Sheets

RADAR SYSTEM, SUB-MODULE, AND RADAR PROCESSING METHOD

CROSS REFERENCE

This application claims a priority on the convention based on Japanese Patent Application No. JP 2012-263463. The disclosure thereof is incorporated herein by reference.

TECHNOLOGY FIELD

The present invention relates to a radar system, and especially to a radar system which executes a distributed aperture process to perform beam synthesis.

BACKGROUND ART

Figure 1:
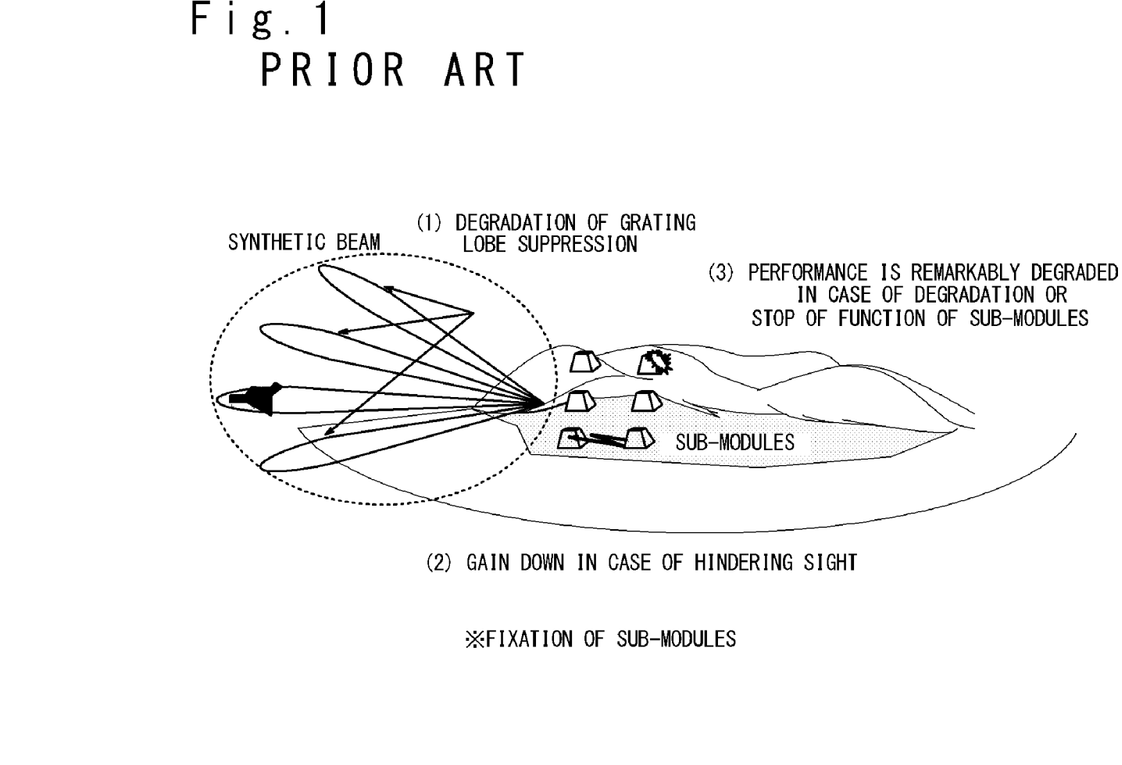
FIG. 1 is a diagram showing a conventional distributed aperture radar system.

In a conventional technique in the field of a radar, a radar system has been developed which performs beam synthesis by executing the so-called "distributed aperture process" which controls and adds the phases and amplitudes of signals from a plurality of sub-modules arranged (fixed) in known optional positions, as shown in FIG. 1. However, there is a following problem in such a technique.

First, there is a problem of "grating lobe" in which the beam of the same intensity as in a desired direction is outputted because equal phase planes are collectively aligned even in a side direction when an interval between elements is longer than a half wavelength. Therefore, the suppression of grating lobe becomes necessary. However, in case that sub-modules are unevenly arranged, the suppression of grating lobe is not enough only by the control of the amplitude and phase, depending on the arrangement of the sub-modules.

Also, when a sub-module interferes with a sight of another sub-module (a line of sight of a beam), the synthetic beam reduces.

Also, when a performance degradation or a function stop occurs in a part of the sub-modules, the whole performance (the radar performance by the synthetic beam) sometimes degrades greatly.

As a prior art in the technical field, Patent Literature 1 (JP 2010-32497A) discloses a radar apparatus and a method of forming a reception beam. In the prior art, an active phase array antenna is divisionally formed in an optional place, to realize the characteristics of the distributed aperture antenna, which results in the superior performance of the radar.

CITATION LIST

[Patent Literature 1] JP 2010-32497 A

SUMMARY OF THE INVENTION

The present invention proposes a distributed aperture type of radar system which uses a mobile type of sub-modules in which the autonomous control are possible.

The radar system according to the present invention contains a plurality of sub-modules which irradiate beams for a distributed aperture radar. Each of the plurality of sub-modules is provided with a beam irradiating section, a moving section to move itself autonomously, and a communication section to communicate with an external unit for a distributed aperture process.

The radar system may further contain a command unit configured to command the sub-modules. The command unit is provided with a measuring section, a communication section, a calculating section and an instructing section. The measuring section measures each sub-module. The communication section is used for the communication with each sub-module. The calculating section acquires necessary data of measurement data of the sub-module, position data received from the sub-module, data of an operation situation of the sub-module and topographical data around the sub-module, calculates a synthetic beam pattern, and calculates the arrangement of the sub-modules as the synthetic beam pattern becomes equal to a predetermined pattern. The instructing section instructs a movement to each sub-module based on the calculated arrangement of the sub-modules.

The radar system can be realized in which an arrangement of the sub-modules can be taken automatically and optimally and the radar system is excellent in the installation performance and the resilience.

DESCRIPTION OF EMBODIMENTS

First Embodiment

Hereinafter, a first embodiment of the present invention will be described with reference to the attached drawings.
(Configuration of Radar System)

Figure 2:
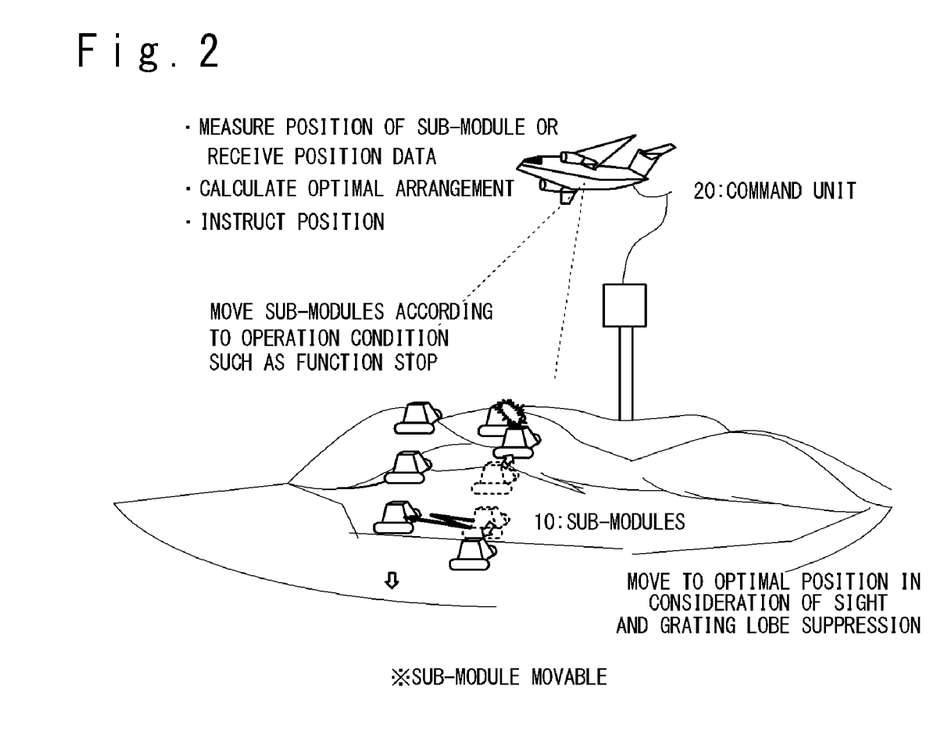
FIG. 2 is a diagram of a radar system according to a first embodiment of the present invention.

As shown in FIG. 2, the radar system according to the present embodiment contains sub-modules 10 (10-$i$, $i$=1 to n: n is an optional number) and a command unit 20.

Each of the sub-modules 10 (10-$i$, $i$=1 to n) irradiates a beam for a distributed aperture radar. It should be noted that the sub-module may be read as a sub-unit. Each sub-module 10 is of a mobile type and is autonomously controllable. In this case, a self-propelled type vehicle is assumed as an example of each sub-module 10. Also, a self-propelled robot (multi-leg robot), a ship, an amphibious vehicle, a flight vehicle in addition to an automobile are exemplified. However, actually, the present invention is not limited to these examples.

The command unit 20 commands each sub-module 10. At least one command unit 20 should exist. As an example of the command unit 20, a flight vehicle such as an aircraft and a command post such as a command tower/a control tower, and a bridge are assumed. However, actually, the present invention is not limited to these examples.
(Configuration of Sub-Module)

Figure 3:
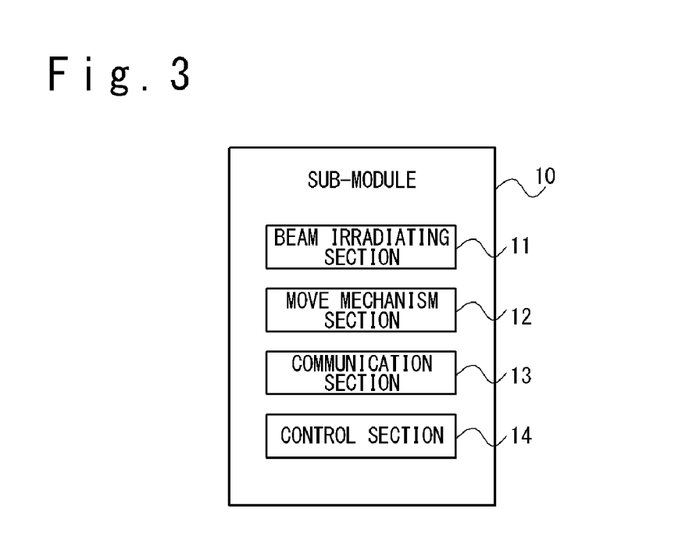
FIG. 3 is a diagram showing a configuration example of a sub-module according to in the first embodiment.

As shown in FIG. 3, each of the sub-modules 10 (10-$i$, $i$=1 to n) is composed of a beam irradiating section 11, a move mechanism section 12, a communication section 13 and a control section 14.

The beam irradiating section 11 irradiates a beam for the distributed aperture radar. If technically available, any kind of beam can be used.

The move mechanism section 12 is a mechanism for moving the sub-module 10 itself. As an example of the move mechanism section 12, travelling units such as wheels, caterpillars, legs are exemplified in case of the ground. Also, propulsion units such as a screw propeller, a water jet, and oars are exemplified in case of the water. Also, propulsion units such as a jet engine, a rocket motor, and rotation wings are exemplified in case of the air. Also, as these power sources, engines such as a motor, and various power facilities are exemplified. However, actually, the present invention is not limited to these examples.

The communication section 13 communicates with an external unit for a distributed aperture process. For example, the communication section 13 is used for communication with another sub-module 10 and the command unit 20. It is supposed that a communication method of the communication section 13 is a radio communication. It should be noted that actually, all the communication paths do not have to be radio paths. For example, a cable communication can be technically used for a part of the communication path by using fixed communication facilities which are arranged nearby. Also, the communication section 13 may carry out the encryption/decryption, and encapsulation/decapsulation of the communication, according to need.

The control section 14 controls the operation and function of the sub-module 10 itself. For example, the control section 14 controls the beam irradiating section 11, the move mechanism section 12 and the communication section 13. As an example of the control section 14, a computer or an electronic device are exemplified. Although being not illustrated, the above-mentioned computer and electronic device are often composed of a processor which executes a predetermined process based on a program, and a memory which stores the program and various kinds of data. It should be noted that the control section 14 uses GPS (Global Positioning System) according to need, and the position data of the sub-module 10 may be acquired by it.

(Configuration of Command Unit)

Figure 4:
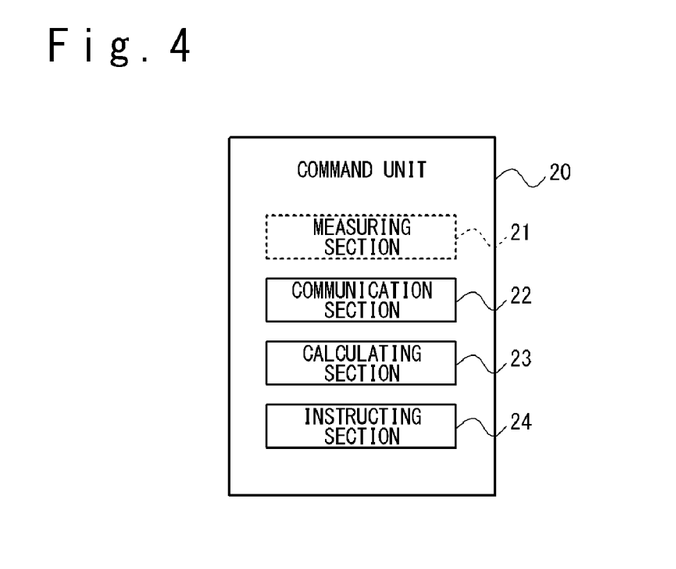
FIG. 4 is a diagram showing a first configuration example of a command unit according to the first embodiment.

As shown in FIG. 4, the command unit 20 is provided with a measuring section 21, a communication section 22, a calculating section 23 and an instructing section 24.

The measuring section 21 monitors and detects each of the sub-modules 10 (10-$i$, i=1 to n) and measures the sub-module 10. For example, the measuring section 21 monitors and senses the sub-modules 10 (10-$i$, i=1 to n) by using communication through the communication section 22 and various kinds of sensors mounted on the command unit 20. It should be noted that the measuring section 21 is to be installed according to need, and may be not installed if being not necessary. In some cases, the communication section 22 may function as the measuring section 21. That is, the communication section 22 may be used as the measuring section 21.

The communication section 22 communicates with each sub-module 10. It is supposed that the communication method of the communication section 22 is a radio communication. It should be noted that actually, all communication paths do not have to be radio communication paths. For example, technically, by using the fixation communication facilities which are arranged nearby, a cable communication can be used for a part of the communication paths. Also, the communication section 22 may carry out the encryption/decryption, and encapsulation/decapsulation of the communication according to need.

The calculating section 23 acquires necessary data (data to be used), of measurement data of each sub-module 10, position data received from each sub-module 10 and data of the operation situation of each sub-module 10, to calculate a synthetic beam pattern, and calculates the arrangement of the sub-modules 10 when the synthetic beam pattern becomes equal to a predetermined pattern. For example, the calculating section 23 calculates the arrangement of each sub-module 10 to be an optimal position in consideration of the suppression and prediction of grating lobe of each sub-module 10. Moreover, the calculating section 23 may acquire topographical data around each sub-module 10, and may calculate the arrangement of each sub-module 10 in consideration of the topographical data. It should be noted that if not being the necessary data (data to be used), it is not necessary to acquire.

The instructing section 24 instructs a movement of each sub-module 10 through the communication section 22 based on the calculated arrangement of the sub-modules 10.

It should be noted that as an example of the measuring section 21, the calculating section 23 and the instructing section 24, a computer and an electronic device are exemplified, like the above-mentioned control section 14. However, actually, the present invention is not limited to these examples.

First Example

A case that the command unit 20 is a flight vehicle such as an aircraft will be described as a first example.

Figure 5:
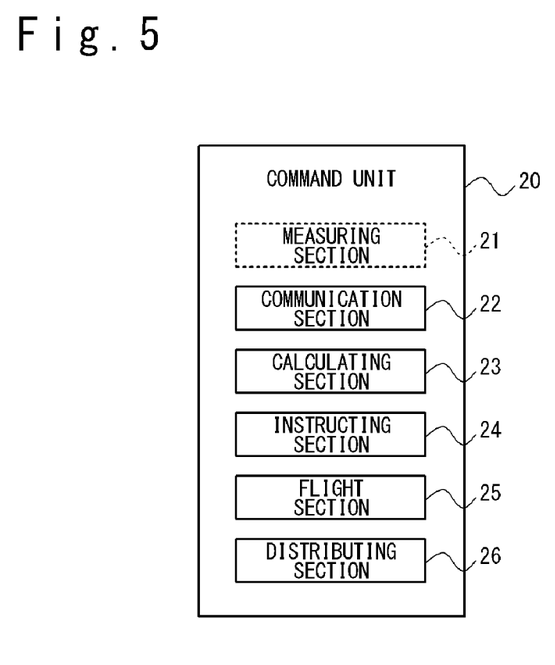
FIG. 5 is a diagram showing a second configuration example of the command unit according to the first embodiment.

In this case, as shown in FIG. 5, the command unit 20 is provided with a flight section 25 and a distributing section 26 in addition to the above-mentioned configuration.

The flight section 25 is a mechanism to fly over a distribution point of the sub-modules 10 (10-$i$, i=1 to n). As an example of the flight section 25, wings and engines used for the aircraft and a propulsion unit used for an airship are exemplified. It should be noted that actually, the command unit 20 is sufficient to stay in or fly over the distribution point and an artificial satellite may be used.

The distributing section 26 is a mechanism to distribute the sub-modules 10 (10-$i$, i=1 to n) from the sky. It should be noted that if it is not necessary to distribute the sub-modules 10 from the sky, the distributing section 26 may be omitted.

Second Example

A case that the command unit 20 is a command post such as a conning tower/a control tower, a bridge will be described as a second example.

In this case, it is suitable that the command unit 20 is a building or a structure having a height from which the sub-modules 10 distributed into a wide area can be observed and detected.

Second Embodiment

Below, a second embodiment of the present invention will be described.

In the present embodiment, the command unit is not used and the distributed aperture radar system is realized by a plurality of sub-modules.

(Configuration of Radar System)

Figure 6:
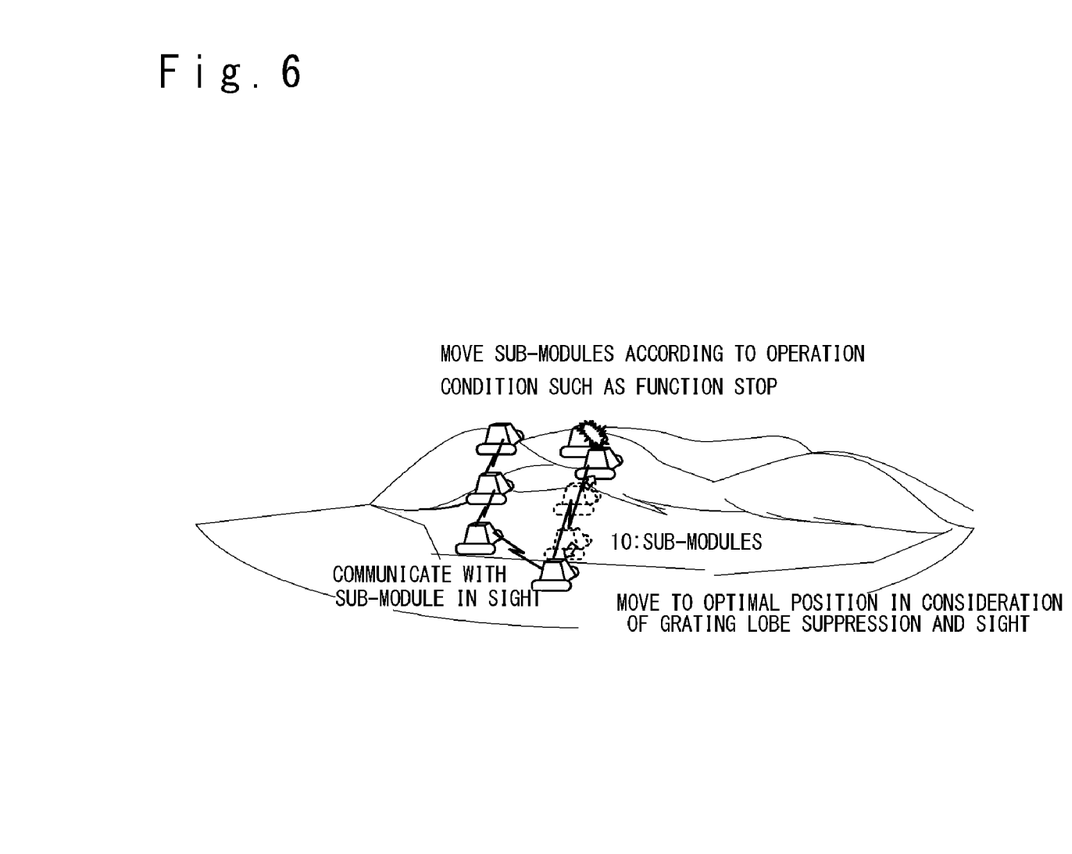
FIG. 6 is a diagram showing the radar system according to a second embodiment of the present invention.

The radar system according to the present embodiment contains the sub-modules 10 (10-$i$, i=1 to n), as shown in FIG. 6.

(Configuration of Sub-Module)

Figure 7:
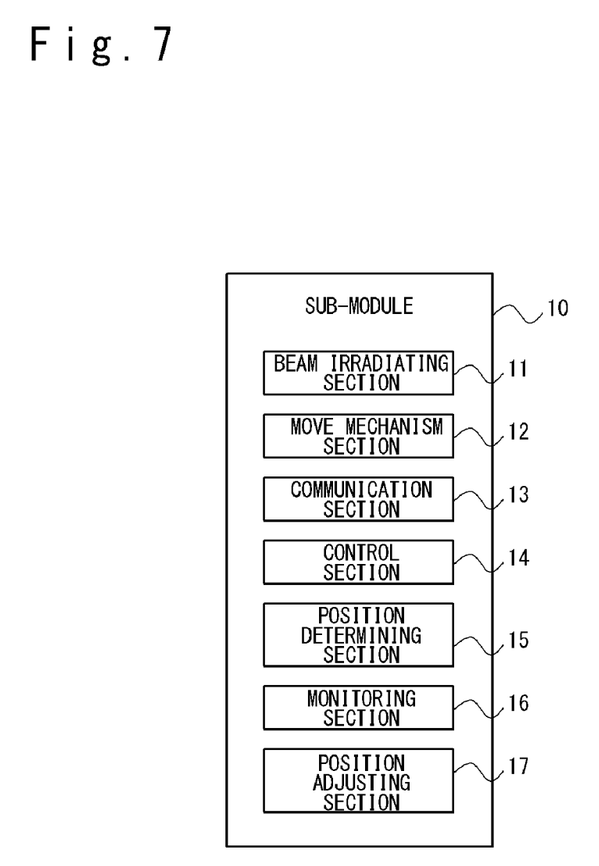
FIG. 7 is a diagram showing a first configuration example of the sub-module according to the second embodiment.

As shown in FIG. 7, each of the sub-modules 10 (10-*i*, i=1 to n) is provided with a position determining section 15, a monitoring section 16 and a position adjusting section 17 in addition to the configuration of the first embodiment.

The position determining section 15 carries out at least one of communication with another sub-module, measurement of a position of the other sub-module and evaluation of its own position of the sub-module, and determines the own position of the sub-module. At this time, the position determining section 15 determines the own position based on the communication data with the other sub-modules located in a communicable area or the positions of the other measurable sub-modules and the own position.

The monitoring section 16 monitors an operation situation mutually among the sub-modules and detects the sub-module in which the function is stopped or degraded. For example, the monitoring section 16 monitors the operation situation mutually by using various kinds of sensors mounted on each sub-module 10 and the communication through the communication section 13.

The position adjusting section 17 adjusts the own position of the sub-module through an autonomous decentralized control. At this time, the position adjusting section 17 drives the move mechanism section 12 to move to a position determined based on the operation situations and the positions in consideration of the prediction and suppression of grating lobe.

Third Example

A case where at least one of the plurality of sub-modules 10 is determined or selected as a reference module functioning as an absolute reference position will be described as a third example.

Figure 8:
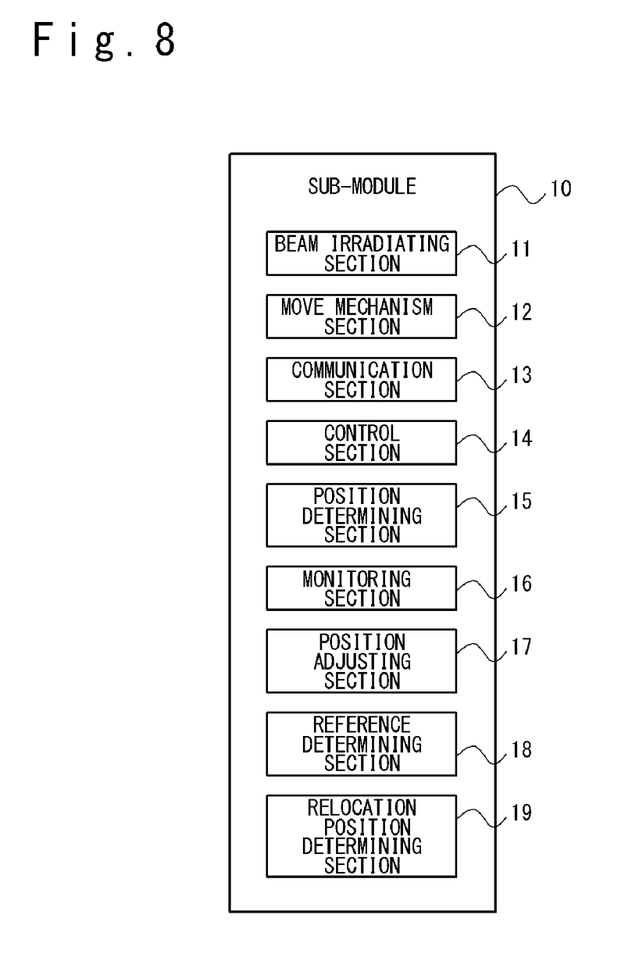
FIG. 8 is a diagram showing a second configuration example of the sub-module according to the second embodiment.

In this case, as shown in FIG. 8, each sub-module 10 is further provided with a reference determining section 18 and a relocation position determining section 19 in addition to the above-mentioned configuration.

The reference determining section 18 determines a reference sub-module from the plurality of sub-modules 10 except for the sub-modules in which the function is stopped or degraded. The reference sub-module may be singular and plural.

The relocation position determining section 19 determines the own relocation position to the determined reference sub-module. For example, the relocation position determining section 19 determines an optimal relative position based on the operation situation and the position of the determined reference sub-module. In this case, the position adjusting section 17 drives the move mechanism section 12 to move the sub-module to the determined position automatically.

It should be noted that the position determining section 15, the monitoring section 16, the position adjusting section 17, the reference determining section 18 and the relocation position determining section 19 may be realized by using the control section 14 through the program control.

RELATION OF EMBODIMENTS

It should be noted that the above-mentioned embodiments may be combined in a range of no conflict between the embodiments.

As described above, the embodiments of the present invention have been described in detail. However, the present invention is not limited to the above-mentioned embodiments and a modification which does not deviate from the scope of the present invention is contained in the present invention.

What is claimed is:

1. A distributed aperture radar system, comprising:
a plurality of sub-modules configured to irradiate beams; and
a flyable command unit configured to (i) calculate an optimal position of each of the sub-modules such that a synthetic beam pattern is irradiated by the beams and (ii) send a command to each of the sub-modules to move to the calculated optimal position,
wherein the flyable command unit calculates the optimal position of each of the sub-modules being calculated based on at least one of measurement data of each of the sub-modules, position data received from each of the sub-modules, operation situation data received from each of the sub-modules, and topographical data around each of the sub-modules, and
wherein the flyable command unit distributes the sub-modules when the flyable command unit flies over a distribution point.

2. A distributed aperture radar system, comprising:
a plurality of sub-modules configured to irradiate beams,
wherein each of the sub-modules (i) determines its own position based on at least one of communication with another sub-module, a measured position of the other sub-module, and an evaluation of its own position and (ii) monitors an operation situation of the other sub-module to detect whether the other sub-module is stopped or is degraded, and
wherein each of the sub-modules adjusts its own position based on a result of the monitoring such that a synthetic beam pattern is irradiated by the beams.

3. The distributed aperture radar system according to claim 2,
wherein each of the sub-modules (i) determines a reference sub-module from among the sub-modules and (ii) determines its own relocation position with respect to the reference sub-module.

* * * * *